July 15, 1969     W. JAHN     3,455,707
OPTICAL CROWN GLASS ON PHOSPHATE BASE
Filed March 10, 1964
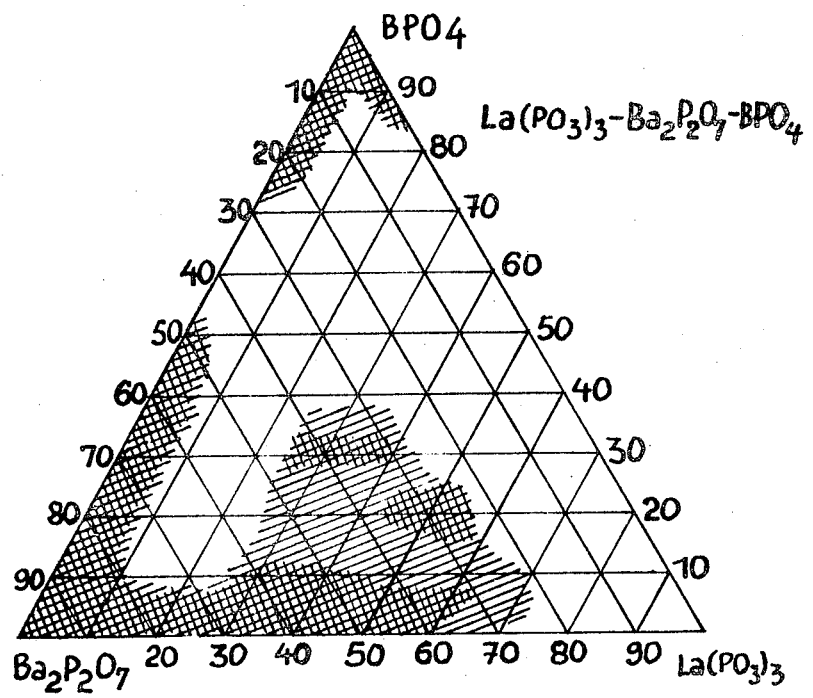
INVENTOR
WALTER JAHN
BY
Burgess, Dinklage & Sprung
ATTORNEYS

United States Patent Office

3,455,707
Patented July 15, 1969

3,455,707
OPTICAL CROWN GLASS ON PHOSPHATE BASE
Walter Jahn, Mainz-Mombach, Germany, assignor to Jenaer Glaswerk-Schott & Gen., Mainz, Germany, a corporation of Germany
Continuation-in-part of application Ser. No. 837,121, Aug. 31, 1959. This application Mar. 10, 1964, Ser. No. 365,544
Claims priority, application Germany, Sept. 6, 1958, J 15,366
Int. Cl. C03c 3/12
U.S. Cl. 106—47            18 Claims

ABSTRACT OF THE DISCLOSURE

Phosphate glasses containing boron orthophosphate in amount of 10–90 mol-percent, lanthanum metaphosphate in amount of 0–80 mol-percent, and barium and/or strontium pyrophosphate in amount of 0–78 mol-percent; and phosphate glasses containing about 12–38 weight percent boron orthophosphate, aluminum and/or lanthanum metaphosphate with the aluminum metaphosphate being about 2–25 weight percent, when present, and the lanthanum metaphosphate being about 5–65 weight percent, when present, and about 20–80 weight percent of barium pyrophosphate, strontium pyrophosphate, barium orthophosphate, strontium orthophosphate or a mixture thereof.

---

This application is a consolidation of Ser. No. 837,121, filed Aug. 31, 1959 and Ser. No. 243,195, filed Dec. 4, 1962, both abandoned.

This invention relates to glass compositions and, more particularly, to new phosphate glasses which contain boron orthophosphate.

The invention comprises glasses having the following essential constituents and within the range of proportions specified, namely:

|  | Mol percent |
|---|---|
| Boron orthophosphate | 10–90 |
| Lanthanum metaphosphate | 0–80 |
| Barium and/or strontium pyrophosphate | 0–78 | and in these compositions of the invention, at least one of the lanthanum metaphosphate and barium and/or strontium pyrophosphate must be present. Glasses of such composition are referred to hereinafter as Type I boron orthophosphate glasses.

The invention further comprises glasses consisting essentially of about 12–38 weight percent boron orthophosphate, about 2–25 weight percent aluminum metaphosphate and/or 5–65 weight percent lanthanum metaphosphate, as well as about 20–80 weight percent of barium and/or strontium pyrophosphate. In these compositions, the content of boron orthophosphate, aluminum metaphosphate, and lanthanum metaphosphate, jointly, is at least about 20 weight percent. The pyrophosphate compounds of barium and/or strontium may be wholly or partially replaced by barium and/or strontium orthophosphates. Glasses of this composition are referred to hereinafter as Type II boron orthophosphate glasses.

Type I boron orthophosphate glasses

FIG. 1 shows a melting diagram, represented on a triangular diagram, in which the ortho, meta, and pyrophosphate components are given in mol percentages. In the figure, the areas in which crystallization occurs, are represented by cross-hatching, the areas wherein glasses in which single crystals are formed are shown by slant lines, and those areas in which glasses substantially without crystal formation are obtained are characterized by absence of any markings.

From an inspection of the triangular melting diagram, which simultaneously discloses the areas of glass and crystalline phases, it is strikingly apparent that the glass area is relatively extensive and extends over more than half of the triangular diagram. Since the size of the area of the glass region, i.e. phase, depends most strongly on the cooling conditions of the respective melts, it must be pointed out that the melts were not chilled, but that, after the melting had been completed, the melts were cooled slowly under stirring and were cast only after having reached a high degree of viscosity. After the transfer of the glass masses into cooling ovens, the same were cooled down slowly. The employing of the aforesaid manner of melting and cooling does not result in crystallization and the characteristics of the glass are in contrast to those of glasses which require rapid cooling or even chilling in order to suppress the crystallization tendencies and prevent lack of stability with the formation of individual crystals or even complete crystallization.

The good glass properties of the glass system in accordance with the invention is dependent not only on the glass-forming characteristics of the lanthanum metaphosphate, because even in the presence of very slight amounts of lanthanum metaphosphate there may be obtained good and serviceable glasses, but also on the interaction between the other two melting components, so that in the end effect there results a glass region of extraordinarily large area. It has been additionally found, in accordance with the invention, that even the binary system $BPO_4=Ba_2P_2O_7$ possesses approximately between 28–47 mol percent $Ba_2P_2O_7$ a glass region.

The glasses produced in accordance with the invention are characterized by very desirable optical values. In this connection, they correspond with reference to their refractive indices, approximately to the heavy crowns. However, they are distinguished by their other dispersion characteristics, that is, their dispersive indices are smaller and therefore their Abbe numbers are greater. Just as significant is their good acid-fastness, which exceeds by far that of the extreme heavy crown glasses having borosilicate bases. They are also characteristically resistant to chemical attack and devitrification.

The barium phosphate component may also be introduced into the glass system as barium orthophosphate in place of the pyrophosphate. Glasses produced in this manner also show good acid-fastness. The optical characteristics of these glasses are even somewhat improved when compared with those prepared with pyrophosphate. However, the area of the glass region of this system is smaller.

In carrying the invention into effect, there may be employed instead of the aforesaid barium phosphate compounds the corresponding phosphates of strontium. The acid-fastness of glass compositions prepared thusly is not altered significantly. The refractive index may be lowered somewhat, as compared to the corresponding barium- containing glasses. The barium and strontium phosphates may also be introduced jointly into the glass.

The glass compositions in accordance with the invention consist of 10–90 mol percent boron orthophosphate and the remainder consists of at least one of lanthanum metaphosphate up to 80 mol percent and barium and/or strontium phosphate up to 78 mol percent.

In accordance with a further development of the invention, 0–40 mol percent of the barium and/or strontium pyrophosphate may be replaced by barium and/or strontium orthophosphate.

In the manufacture of these glasses, any of the phosphates or all of them may be used in the form of their corresponding oxides. Thus, phosphorpentoxide and metal and/or non-metal oxides may be effectively used as substitutes for the phosphates. In the selection of oxidic starting materials, care must be taken to avoid the objectionable tendency of the oxidic glasses to devitrify, that is, crystallize during melting or working. They also tend to be unstable chemically and are subject to excessive weathering. Additionally, the oxides have significant effects on the optical properties of the glasses and their addition must be regulated to produce the desired optical requirements.

There also has to be considered the tendency of phosphorpentoxide to sublimation and evaporation, whereby there always results loss of substance.

By exercise of suitable control, however, there exists in accordance with the invention the possibility to use oxidic raw materials in the production of optical glasses. Thus, if a sufficient excess of the readily sublimable or vaporizable components, i.e. the phosphorpentoxide, are put into the glass mixture, there may be obtained a glass in accordance with the invention, which is formed from oxides corresponding to the phosphates.

It has been found that the introduction of small amounts of oxides, that is up to 8 mol-percent of the oxides aluminum and silicon, into the glasses may be of advantage, in that thereby small shifts in the optical values may be obtained. Thus, for example, alumina lowers the nu value, and $SiO_2$ tends to raise the refractive index and nu value.

The melting of the optical crown glasses is carried out at temperature between about 1300 and 1400° C. The glasses of this type are melted in platinum vessels. The use of platinum eliminates corrosion and solution of the pot and thus leads to greater reproducibility.

During the stirring, the glasses are permitted to cool down to about 1200–1100° C. After the glasses are removed from the melting oven, they are poured into preheated forms, i.e. molds, and these are transferred into cooling ovens. The transformation region of the glasses lies between about 500 and 600° C. and the glasses can be cooled from this temperature at a rate of about 15–20° C. per minute. The procedure for production can be according to the example set forth hereinafter, in the section hereof on Type II glasses.

The following table give the composition of various examples of batches according to the present invention, which produce good quality glass. The percentages are given with respect to mol-percent.

TABLE I

[Mol percent]

| No. | 1 | 2 | 3 | 4 | 5 | 6 |
|---|---|---|---|---|---|---|
| $La(PO_3)_3$ | 15 | 20 | 30 | 10 | 10 | 20 |
| $Ba_2P_2O_7$ | 70 | 60 | 15 | 55 | 40 | 35 |
| $BPO_4$ | 15 | 20 | 55 | 35 | 50 | 45 |
| $n_d$ | 1.6274 | 1.6230 | 1.5923 | 1.6201 | 1.6066 | 1.6145 |
| $\nu$ | 61.34 | 63.37 | 63.78 | 62.94 | 64.10 | 62.60 |

| No. | 7 | 8 | 9 | 10 | 11 | 12 |
|---|---|---|---|---|---|---|
| $La(PO_3)_3$ | 10 | 10 | 7.5 | 17.5 | 20 | 30 |
| $Ba_2P_2O_7$ | 25 | 10 | 17.5 | 7.5 | 15 | 25 |
| $BPO_4$ | 65 | 80 | 75 | 75 | 65 | 45 |
| $n_d$ | 1.5888 | 1.5752 | 1.5775 | 1.5704 | 1.5834 | 1.6106 |
| $\nu$ | 65.92 | 66.88 | 67.76 | 66.22 | 65.30 | 63.34 |

| No. | 13 | 14 | 15 | 16 | 17 | 18 |
|---|---|---|---|---|---|---|
| $La(PO_3)_3$ | 45 | 39.13 | 48 | 65 | 60 | 75 |
| $Ba_2P_2O_7$ | 10 | 26.09 | 22 | 10 | 20 | 15 |
| $BPO_4$ | 45 | 34.78 | 30 | 25 | 20 | 10 |
| $n_d$ | 1.5925 | 1.6078 | 1.6044 | 1.5964 | 1.6044 | 1.6067 |
| $\nu$ | 62.53 | 63.46 | 62.23 | 62.02 | 61.72 | 60.83 |

| No. | 19 | 20 | 21 | 22 | 23 | 24 |
|---|---|---|---|---|---|---|
| $La(PO_3)_3$ | 30 | 20 | | | 50 | 42.85 | 42.85 |
| $Ba_2P_2O_7$ | | | 35 | | | 28.57 | 28.57 |
| $BPO_4$ | 55 | 45 | 65 | 50 | 23.82 | 23.82 |
| $Sr_3(PO_4)_2$ | 15 | 35 | | | | |
| $Al_2O_3$ | | | | | 4.76 | |
| $SiO_2$ | | | | | | 4.76 |
| $n_d$ | 1.5917 | 1.5991 | 1.5996 | 1.5842 | 1.6122 | 1.6116 |
| $\nu$ | 62.90 | 64.13 | 65.95 | 61.13 | 62.27 | 61.47 |

| No. | 25 | 26 | 27 | 28 | 29 | 30 |
|---|---|---|---|---|---|---|
| $La(PO_3)_3$ | 22 | 41 | 16 | 20 | 30 | 20 |
| $Ba_2P_2O_7$ | | | 32 | | | |
| $BPO_4$ | 48 | 39 | 44 | 70 | 55 | 55 |
| $Sr_2P_2O_7$ | 30 | 13 | | | | |
| $Sr_3(PO_4)_2$ | | 7 | 8 | | | |
| $Ba_3(PO_4)_2$ | | | | 10 | 15 | 25 |
| $n_d$ | 1.5859 | 1.5048 | 1.6124 | 1.5940 | 1.6083 | 1.6139 |
| $\nu$ | 66.38 | 63.73 | 63.30 | 65.13 | 62.32 | 63.61 |

Type II glasses

These glasses are crown glasses with very slight color dispersion and relatively high refractive values. Most of these glasses fall in the part of the $n_d$-$\nu$ diagram generally assigned to phosphate heavy crown glass with $\nu$-values between 60 and 96 as well as refractive indices between 1.55 and 1.63. More broadly, $\nu$-values can be 45–69, and refractive indices can be 1.55–1.65.

Through the addition of arsenic, antimony and bismuth oxide, the optical values of the glasses can be substantially varied. The light-dispersion can be increased while at the same time increasing the refractive values, so that these glasses fall into the range of the heavy and heaviest crown. With respect to the known boro-silicate glasses of these types, the new glasses have substantially better resistance to acid as well as diverging theta values.

Glasses according to the invention differ from known glasses, particularly in their content of aluminum and/or lanthanum metaphosphate, and in their content of metaphosphate along with addition of oxides of polyvalent elements.

The metaphosphates of aluminum and lathanum provide good stability with respect to glassiness, and this permits the use of larger quantities of oxides and also larger quantities of pyro- and orthophosphates, without devitrification due to the inclusion in the glass of the materials which are not glass-forming materials.

The high atomic ratio of oxygen to phosphorus in the glasses has further consequence of increasing the chemical stability of the glasses. According to the selection of the respective glass components, herein an extreme resistance to weather or acid may be realized.

The pyrophosphate compounds of barium and/or strontium may be wholly or partially replaced by barium and/or strontium orthophosphates. The entire partial replacement is in general associated with an increase of the refractive values as well as an increase of the chemical stability. For example, up to 40 mol-percent of the barium or strontium pyrophosphate can be replaced by barium and/or strontium orthophosphate.

According to a further development of the invention, the glasses are characterized by the presence of up to about 20 weight percent of the oxides of magnesium, calcium, strontium, barium, zinc, cadmium, or lead. The oxides improve resistance to weather and permit a varying of the optical properties.

The presence of up to 6 weight precent of oxides of titanium or tungsten improve the acid resistance of the glasses.

The presence of up to about 18 weight percent of the oxides of antimony or about 18 weight percent of the oxides of bismith, and/or up to about 33 weight percent of arsenic oxide permits a marked improvement in the optical properties of the glasses in the direction of greater color dispersion and in an increase of the refractive values up to about 1.66.

With respect to the oxide groups mentioned, oxides from each of these groups can be included to obtain the effects provided thereby, and mixtures of each group can be used. As lower limits for the amount of oxide, any amount, e.g. a fraction of a percent and preferably at least a few percent, can be used to impart some measure of the various effects provided.

Examples of the glasses according to the invention are set forth in Table II–A wherein compositions are given in weight percent, and Table II–B where the corresponding composition in mol-percent is given.

TABLE II-A

[Weight percent]

| No | 1 | 2 | 3 | 4 | 5 | 6 | 7 |
|---|---|---|---|---|---|---|---|
| $Al(PO_3)_3$ | 21.2 | 4.0 | 19.1 | 3.0 | 5.5 | 10.7 | |
| $La(PO_3)_3$ | 24.4 | 7.0 | | 6.0 | | | 27.9 |
| $BPO_4$ | 28.0 | 30.1 | 16.7 | 13.0 | 29.5 | 30.0 | 36.6 |
| $Ba_2P_2O_7$ | 26.4 | 37.7 | 64.2 | 78.0 | 32.0 | 54.4 | 33.3 |
| $Sr_2P_2O_7$ | | 21.2 | | | 26.0 | | |
| MgO | | | | | | 7.0 | 4.9 | 2.2 |
| $n_d$ | 1.556 | 1.590 | 1.591 | 1.602 | 1.595 | 1.589 | 1.582 |
| $\nu$ | 68.0 | 67.1 | 63.9 | | 66.3 | 69.2 | 66.0 |

| No | 8 | 9 | 10 | 11 | 12 | 13 |
|---|---|---|---|---|---|---|
| $Al(PO_3)_3$ | 3.0 | | 10.5 | 8.1 | 24.2 | |
| $La(PO_3)_3$ | | 13.2 | 8.2 | 25.4 | | 61.9 |
| $BPO_4$ | 24.3 | 18.6 | 32.1 | 22.9 | 29.6 | 12.2 |
| $Ba_2P_2O_7$ | 55.8 | 63.2 | 30.2 | | | 22.1 |
| $Sr_2P_2O_7$ | | | | 33.4 | 31.8 | |
| CaO | 16.9 | 5.0 | | | | |
| SrO | | | 19.0 | | | 3.8 |
| BaO | | | | 10.2 | 14.4 | |
| $n_d$ | 1.620 | 1.617 | 1.563 | 1.577 | 1.557 | 1.611 |
| $\nu$ | 63.5 | 63.8 | | 66.9 | 68.6 | 61.3 |

| No | 14 | 15 | 16 | 17 | 18 | 19 | 20 |
|---|---|---|---|---|---|---|---|
| $Al(PO_3)_3$ | 7.4 | 2.9 | 2.9 | | 3.0 | | |
| $La(PO_3)_3$ | | | | 7.4 | | 29.2 | 29.2 |
| $BPO_4$ | 22.4 | 17.9 | 24.1 | 26.9 | 17.8 | 22.5 | 22.5 |
| $Ba_2P_2O_7$ | 56.6 | 74.3 | 61.3 | 52.7 | 73.7 | 43.5 | 43.5 |
| ZnO | 13.6 | 4.8 | | | | | |
| CdO | | | 11.7 | | | | |
| PbO | | | | 13.0 | 5.6 | | |
| $TiO_2$ | | | | | | 4.8 | |
| $WO_3$ | | | | | | | 4.8 |
| $n_d$ | 1.610 | 1.609 | 1.620 | 1.630 | 1.625 | 1.643 | 1.608 |
| $\nu$ | 63.4 | 64.1 | 62.5 | 57.3 | 60.3 | 45.7 | 60.4 |

| No | 21 | 22 | 23 | 24 | 25 | 26 |
|---|---|---|---|---|---|---|
| $La(PO_3)_3$ | 14.9 | 51.6 | 7.1 | 7.7 | 5.8 | 14.3 |
| $BPO_4$ | 27.4 | 12.8 | 25.8 | 28.1 | 21.3 | 26.2 |
| $Ba_2P_2O_7$ | 44.7 | 30.8 | 50.5 | 55.1 | 41.8 | 42.8 |
| $Sb_2O_3$ | 13.0 | 4.8 | | | | |
| $Bi_2O_3$ | | | 16.7 | 9.1 | | |
| $As_2O_3$ | | | | | 31.0 | 16.7 |
| $n_d$ | 1.635 | 1.620 | 1.656 | 1.626 | 1.612 | 1.606 |
| $\nu$ | 53.7 | 62.8 | 49.6 | 55.7 | 60.3 | 61.4 |

| No | 27 | 28 | 29 | 30 | 31 | 32 | 33 |
|---|---|---|---|---|---|---|---|
| $Al(PO_3)_3$ | 9.0 | 3.0 | 2.9 | 3.5 | 4.5 | 4.0 | 11.9 |
| $La(PO_3)_3$ | 6.5 | | | | | 6.0 | 24.2 |
| $BPO_4$ | 26.2 | 24.6 | 32.0 | 23.8 | 30.0 | 12.0 | 23.1 |
| $Sr_2P_2O_7$ | 8.2 | | | | | | |
| $Ba_3(PO_4)_2$ | 50.1 | 62.1 | 56.1 | 41.0 | 38.2 | 78.0 | 27.1 |
| $Sr_3(PO_4)_2$ | | | | 21.0 | 16.0 | | |
| CaO | | 10.3 | | 5.6 | 2.3 | | 4.5 |
| CdO | | | 9.0 | | 9.0 | | 9.2 |
| ZnO | | | | 5.1 | | | |
| $n_d$ | 1.570 | 1.617 | 1.602 | 1.590 | 1.605 | 1.601 | 1.609 |
| $\nu$ | 67.6 | 63.9 | 65.8 | 66.5 | 64.4 | | 63.2 |

| No | 34 | 35 | 36 | 37 | 38 | 39 |
|---|---|---|---|---|---|---|
| $Al(PO_3)_3$ | 5.5 | 10.5 | 7.2 | 10.0 | 18.0 | 24.0 |
| $La(PO_3)_3$ | 7.0 | 10.5 | | | | |
| $BPO_4$ | 31.0 | 21.5 | 19.0 | 32.0 | 25.0 | 31.0 |
| $Ba_2P_2O_7$ | 25.9 | 34.7 | | 41.0 | 43.0 | |
| $Sr_2P_2O_7$ | | 5.0 | 62.5 | | | 31.0 |
| $Sr_3(PO_4)_2$ | 12.2 | | | 9.0 | | |
| MgO | 18.4 | | | 4.0 | | 4.0 |
| CaO | | 2.5 | | | | 4.0 |
| ZnO | | 11.3 | 11.3 | 4.0 | 4.0 | 6.0 |
| CdO | | 4.0 | | | 10.0 | |
| $n_d$ | 1.593 | 1.607 | 1.581 | 1.613 | 1.609 | 1.567 |
| $\nu$ | 66.1 | 63.5 | 66.0 | | 62.6 | 66.9 |

TABLE II-B

[Mol. percent]

| No | 1 | 2 | 3 | 4 | 5 | 6 | 7 |
|---|---|---|---|---|---|---|---|
| $Al(PO_3)_3$ | 17.1 | 3.3 | 19.4 | 3.5 | 3.4 | 7.1 | |
| $La(PO_3)_3$ | 13.8 | 4.0 | | 4.9 | | | 13.5 |
| $BPO_4$ | 56.4 | 61.4 | 42.3 | 37.9 | 45.0 | 50.0 | 63.0 |
| $Ba_2P_2O_7$ | 12.6 | 18.1 | 38.3 | 53.7 | 11.5 | 21.4 | 13.5 |
| $Sr_2P_2O_7$ | | 13.1 | | | 12.0 | | |
| MgO | | | | | 28.0 | 21.4 | 9.9 |
| $n_d$ | 1.556 | 1.590 | 1.591 | 1.602 | 1.595 | 1.589 | 1.582 |
| $\nu$ | 68.0 | 67.1 | 63.9 | | 66.3 | 69.2 | 66.0 |

| No | 8 | 9 | 10 | 11 | 12 | 13 |
|---|---|---|---|---|---|---|
| $Al(PO_3)_3$ | 1.7 | | 6.4 | 6.4 | 16.5 | |
| $La(PO_3)_3$ | | 8.0 | 3.5 | 14.2 | | 45.0 |
| $BPO_4$ | 34.4 | 39.9 | 49.3 | 45.4 | 50.3 | 31.5 |
| $Ba_2P_2O_7$ | 18.6 | 31.9 | 10.9 | | | 13.4 |
| $Sr_2P_2O_7$ | | | | 20.0 | 16.4 | |
| CaO | 45.2 | 20.2 | | | | |
| SrO | | | 29.8 | | | |
| BaO | | | | 13.9 | 16.9 | 10.0 |
| $n_d$ | 1.620 | 1.617 | 1.563 | 1.577 | 1.557 | 1.611 |
| $\nu$ | 63.5 | 63.8 | | 66.9 | 68.6 | 61.3 |

| No | 14 | 15 | 16 | 17 | 18 | 19 | 20 |
|---|---|---|---|---|---|---|---|
| $Al(PO_3)_3$ | 5.3 | 2.7 | 2.4 | | 3.1 | | |
| $La(PO_3)_3$ | | | | 4.4 | | 17.4 | 19.0 |
| $BPO_4$ | 39.7 | 41.8 | 48.8 | 56.5 | 45.6 | 47.5 | 52.1 |
| $Ba_2P_2O_7$ | 23.7 | 40.9 | 29.3 | 26.1 | 44.5 | 21.7 | 23.8 |
| ZnO | 31.4 | 14.6 | | | | | |
| CdO | | | 19.5 | | | | |
| PbO | | | | 12.9 | 6.8 | | |
| $TiO_2$ | | | | | | 13.4 | |
| $WO_3$ | | | | | | | 5.1 |
| $n_d$ | 1.610 | 1.609 | 1.620 | 1.630 | 1.625 | 1.643 | 1.608 |
| $\nu$ | 63.4 | 64.1 | 62.5 | 57.3 | 60.3 | 45.7 | 60.4 |

| No | 21 | 22 | 23 | 24 | 25 | 26 |
|---|---|---|---|---|---|---|
| $La(PO_3)_3$ | 8.9 | 40.0 | 4.6 | 4.8 | 3.3 | 8.2 |
| $BPO_4$ | 58.5 | 35.2 | 59.3 | 62.0 | 43.1 | 53.2 |
| $Ba_2P_2O_7$ | 22.5 | 20.0 | 27.4 | 28.7 | 20.0 | 20.5 |
| $Sb_2O_3$ | 10.1 | 4.8 | | | | |
| $Bi_2O_3$ | | | 8.7 | 4.6 | | |
| $As_2O_3$ | | | | | 33.6 | 18.1 |
| $n_d$ | 1.635 | 1.620 | 1.656 | 1.626 | 1.612 | 1.606 |
| $\nu$ | 53.7 | 62.8 | 49.6 | 55.7 | 60.3 | 61.4 |

| No | 27 | 28 | 29 | 30 | 31 | 32 | 33 |
|---|---|---|---|---|---|---|---|
| $Al(PO_3)_3$ | 8.4 | 2.1 | 2.3 | 2.6 | 3.3 | 5.5 | 8.6 |
| $La(PO_3)_3$ | 4.3 | | | | | 5.8 | 12.3 |
| $BPO_4$ | 61.0 | 43.8 | 63.4 | 43.6 | 55.5 | 41.4 | 41.6 |
| $Sr_2P_2O_7$ | 5.8 | | | | | | |
| $Ba_3(PO_4)_2$ | 20.5 | 19.4 | 19.6 | 13.2 | 12.4 | 47.3 | 8.6 |
| $Sr_3(PO_4)_2$ | | | | 9.0 | 6.9 | | |
| CaO | | 34.6 | | 19.4 | 8.0 | | 15.3 |
| CdO | | | 14.7 | | 13.7 | | 13.6 |
| ZnO | | | | 12.2 | | | |
| $n_d$ | 1.570 | 1.617 | 1.602 | 1.590 | 1.605 | 1.601 | 1.609 |
| $\nu$ | 67.6 | 63.9 | 65.8 | 66.5 | 64.4 | | 63.2 |

| No | 34 | 35 | 36 | 37 | 38 | 39 |
|---|---|---|---|---|---|---|
| $Al(PO_3)_3$ | 2.4 | 6.9 | 5.2 | 6.3 | 12.9 | 12.7 |
| $La(PO_3)_3$ | 2.1 | 4.8 | | | | |
| $BPO_4$ | 33.6 | 35.2 | 34.2 | 50.4 | 44.8 | 40.9 |
| $Ba_2P_2O_7$ | 6.6 | 13.4 | | 15.2 | 18.2 | |
| $Sr_2P_2O_7$ | | 2.5 | 34.1 | | | 12.4 |
| $Sr_3(PO_4)_2$ | 3.1 | | | 3.3 | | |
| MgO | 52.2 | | | 16.5 | | 13.8 |
| CaO | | 7.7 | | | | 9.9 |
| ZnO | | 24.0 | 26.4 | 8.2 | 9.3 | 10.3 |
| CdO | | 5.4 | | | 14.8 | |
| $n_d$ | 1.593 | 1.607 | 1.581 | 1.613 | 1.609 | 1.567 |
| $\nu$ | 66.1 | 63.5 | 66.0 | | 62.6 | 66.9 |

For the production of the glasses, it is possible to introduce phosphates into the melt wholly or partially in the form of the respective oxides as is described above in respect to Type I glasses. However, the use of oxides involves the disadvantages of striation formation and sublimation and evaporation of phosphorous pentoxide whereby material loss occurs. These disadvantages occasion a reduction in the optical quality and a reduction in the reproducibility of the optical values.

An example of production of a glass according to the invention is set forth below, for glass No. 35 of the table.

Example

Raw materials as follows and in the amounts indicated are used for a ½ liter melt:

|  | G. |
|---|---|
| $BPO_4$ | 215.0 |
| $Al(PO_3)_3$ | 105.0 |
| $Ba_2P_2O_7$ | 347.0 |
| $Sr_2P_2O_7$ | 50.0 |
| $CaCO_3$ | 44.8 |
| ZnO | 113.0 |
| CdO | 40.0 |
| $La(PO_3)_3$ | 105.0 |

The materials are mixed and the mixture (in all 1019.8 g.) contained in a platinum crucible of about 700 cm.³ capacity, is melted down in an electric furnace. For the melting, the mixture is added little by little to the crucible. The melting takes place at a temperature of 1250° C. and requires a time of about 40 minutes. Hereupon the temperature is, for the purification of the glass, raised in 15 minutes to 1280° C. and purified at this temperature for 30 minutes. Thereafter, the melt is continuously stirred over a period of 30 minutes, with the aid of a platinum stirrer, while the furnace temperature is continuously lowered to 1150° C. by reduction in the heating. Then the crucible is taken from the furnace, and the viscous glass flux is poured into a mold of heat resistant steel, which previously, for the avoidance of the sticking of the glass, was rubbed with talcum. The mold is transferred into a cooling furnace, which is at a temperature of 490° C., and cooled with a cooling speed of about 15° per hour, to room temperature.

The melting down of the glasses takes place appropriately in platinum crucibles in oxidizing or neutral atmosphere at about 1250–1300° C.; during the subsequent stirring one lets the glasses cool to about 1100–1150° C. After the removal of the crucibles from the smelting furnace, the glass is poured, after reaching the desired degree of viscosity, into pre-heated molds, which are transferred for slow cooling into cooling furnaces.

The glass thus obtained may be designated as an optical crude glass and may be marketed as such. The subsequent treatment depends largely on the intended use, and it is generally not effected by the glass-maker but by the producer, who may, for example, reheat the same, followed by a fine-cooling and annealing, shaping through hot-pressing, etc.

Alternatively, the production may be effected so that the cooling operation is effected as a fine-cooling in the conventional manner, or in which the glass, still in the liquid state, is molded, etc.

The invention, however, is not concerned with the specific treatment of the glass for any particular purpose.

In the Type II glasses, aluminum oxide and silicon oxide can be used for the purpose and in the amounts set forth, in reference to Type I glasses. Further, in the Type I glasses, the oxides of arsenic, antimony, and bismuth, and the oxides of magnesium, calcium, strontium, barium, zinc, cadmium, and lead, and the oxides of titanium and tungsten can be used for the purposes and in the amounts set forth, in reference to Type II glasses.

While the invention has been described with respect to particular embodiments thereof, various modifications will occur to those skilled in the art, and it is desired to secure by these Letters Patent all such alterations as are within the scope of the appended claims.

What is claimed is:

1. A phosphate optical crown glass, comprising 53–72 mol-percent of boron orthophosphate, the remainder consisting of barium pyrophosphate.

2. A phosphate optical crown glass according to claim 1, wherein up to 40 mol percent of barium pyrophosphate is replaced by at least one member selected from the group consisting of barium orthophosphate and strontium orthophosphate, the total replacement not exceding 40 mol-percent.

3. A phosphate optical crown glass, comprising about 50 mol-percent of boron orthophosphate, the remainder consisting of lanthanum metaphosphate.

4. A phosphate optical crown glass having an index of refraction of 1.6230 and an Abbe value $\nu$ of 63.37 consisting essentially of 20 mol-percent of lanthanum metaphosphate, 60 mol-percent of barium pyrophosphate and 20 mol-percent of boron orthophosphate.

5. Phosphate optical crown glass with an index of refraction of 1.57 to 1.63 and an Abbe value of 60–68 consisting essentially of 10–90 mol-percent of boron orthophosphate and 90–10 mol-percent of material selected from the group consisting of barium pyrophosphate, strontium pyrophosphate, and mixtures thereof, and lanthanum metaphosphate and in which the pyrophosphate does not exceed 78 mol-percent and in which the lanthanum metaphosphate does not exceed 80 mol-percent.

6. A phosphate optical crown glass with an index of refraction of 1.57 to 1.63 and an Abbe value of 60–68 consisting essentially of 10–90 mol-percent of boron orthophosphate and 90–10 mol-percent of a mixture of barium pyrophosphate and lanthanum metaphosphate and in which the pyrophosphate present does not exceed 78 mol-percent and in which the lanthanum metaphosphate present does not exceed 80 mol-percent as shown in the ternary diagram.

7. A phosphate optical crown glass according to claim 5, wherein up to 40 mol-percent of a member selected from the group consisting of strontium pyrophosphate, barium pyrophosphate, and mixtures thereof is replaced by a member selected from the group consisting of barium orthophosphate, strontium orthophosphate and mixtures thereof.

8. A phosphate optical crown glass according to claim 5, wherein up to 8 mol-percent of one of said phosphate group members is replaced by a member selected from the group consisting of aluminum oxide, silicon oxide, and mixtures thereof.

9. A phosphate optical crown glass according to claim 7, wherein up to 8 mol-percent of one of said phosphate group members is replaced by a member selected from the group consisting of aluminum oxide, silicon oxide, and mixtures thereof.

10. A phosphate optical crown glass according to claim 6, wherein at least a part of said barium pyrophosphate is replaced by strontium pyrophosphate.

11. A phosphate optical crown glass according to claim 6, wherein up to 8 mol-percent of said phosphates is replaced by a member selected from the group consisting of aluminum oxide, silicon oxide, and mixtures thereof.

12. A phosphate optical crown glass according to claim 10, wherein up to 40 mol-percent of a member selected from the group consisting of strontium pyrophosphate, barium pyrophosphate and mixtures thereof is replaced by a member selected from the group consisting of barium orthophosphate, strontium orthophosphate, and mixtures thereof.

13. An optical glass consisting essentially of:
    (a) boron orthophosphate in amount of about 12–38 weight percent;
    (b) material selected from the groups consisting of aluminum metaphosphate lanthanum metaphosphate and mixtures thereof the amount of aluminum metaphosphate in the glass being about 2–25 weight percent, and the amount of lanthanum metaphosphate in the glass being about 5–65 weight percent;
    (c) material selected from the group consisting of barium pyrophosphate, strontium pyrophosphate, barium orthophosphate, strontium orthophosphate, and mixtures thereof, in amount of about 20–80 weight percent;

with the proviso that the amount of boron orthophosphate, aluminum metaphosphate, and lanthanum metaphosphate is at least about 20 weight percent of the glass, said glass having an $\nu$-value of 45–69 and a refractive index of 1.55–1.65.

14. An optical glass consisting essentially of:
    (a) boron orthophosphate in amount of about 12–38 weight percent;
    (b) material selected from the group consisting of aluminum metaphosphate, lanthanum metaphosphate, and mixtures thereof, the amount of aluminum metaphosphate in the glass being about 2–25 weight percent, and the amount of lanthanum metaphosphate in the glass being about 5–65 weight percent;
    (c) material selected from the group consisting of barium pyrophosphate, strontium pyrophosphate, and mixtures thereof, in an amount of about 20–80 weight percent;

with the proviso that the amount of boron orthophosphate, aluminum metaphosphate, and lanthanum metaphosphate is at least about 20 weight percent of the glass, said glass having an $\nu$-value of 45–69 and a refractive index of 1.55–1.65.

15. An optical crown glass according to claim 13, and including material selected from the group consisting of magnesium oxide, calcium oxide, strontium oxide, barium oxide, zinc oxide, cadmium oxide, and lead oxide in an amount of up to about 20 weight percent.

16. An opitcal crown glass according to claim 14, and including material selected from the group consisting of magnesium oxide, calcium oxide, strontium oxide, barium oxide, zinc oxide, cadmium oxide, and lead oxide in an amount of up to about 20 weight percent.

17. An optical crown glass according to claim 13, and including material selected from the group consisting of titanium oxide, and tungsten oxide in an amount of up to about 6 weight percent.

18. An optical crown glass according to claim 13, and including a material selected from the group consisting of antimony oxide, bismuth oxide, and arsenic oxide, the amount of antimony oxide being up to about 18 weight percent, the amount of bismuth being up to about 18 weight percent, and the amount of arsenic oxide being up to about 33 weight percent.

References Cited
UNITED STATES PATENTS

| | | |
|---|---|---|
| 2,578,194 | 8/1950 | Silverman. |
| 2,544,460 | 3/1951 | Kreidl. |
| 2,777,774 | 1/1957 | Weissenberg. |
| 2,996,391 | 8/1961 | Weissenberg. |
| 2,996,392 | 8/1961 | Bromer et al. |
| 3,216,836 | 11/1965 | Jahn. |

HELEN M. McCARTHY, Primary Examiner

U.S. Cl. X.R.

106—52, 53, 54

PO-1050
(5/69)

UNITED STATES PATENT OFFICE
CERTIFICATE OF CORRECTION

Patent No. 3,455,707      Dated July 15, 1969

Inventor(s) Walter Jahn

It is certified that error appears in the above-identified patent and that said Letters Patent are hereby corrected as shown below:

1. Col. 2, line 31, "glass" should read --glassy--.
2. Col. 3, line 23, "oxides aluminum" should read --oxides of aluminum--.
3. Col. 4, line 14, "96" should read --69--.
4. Col. 6, line 15, "n" should read --$n_d$--.
5. Col. 8, line 36, between "metaphosphate" and "lanthanum" a comma should be inserted.
6. Col. 9, line 12, between "bismuth" and "being" should be inserted --oxide--.
7. First reference "2,578,194" should be --2,518,194--.

SIGNED AND
SEALED
MAY 19 1970

(SEAL)
Attest:

Edward M. Fletcher, Jr.
Attesting Officer

WILLIAM E. SCHUYLER, JR.
Commissioner of Patents